United States Patent [19]

Schrell et al.

[11] Patent Number: 5,986,087
[45] Date of Patent: Nov. 16, 1999

[54] SULFONATION OF REGENERATED CELLULOSE WITH SULFONATED POLYMERS AND USE OF THE THUS MODIFIED FIBRES

[75] Inventors: Andreas Schrell, Kriftel; Bernd Huber, Kelheim, both of Germany

[73] Assignee: DyStar Textilfarben GmbH & Co. Deutschland KG, Frankfurt am Main, Germany

[21] Appl. No.: 08/952,950

[22] PCT Filed: May 15, 1996

[86] PCT No.: PCT/EP96/02081

§ 371 Date: Nov. 21, 1997

§ 102(e) Date: Nov. 21, 1997

[87] PCT Pub. No.: WO96/37641

PCT Pub. Date: Nov. 28, 1996

[30] Foreign Application Priority Data

May 24, 1995 [DE] Germany .................. 195 19 025

[51] Int. Cl.[6] ............... C07H 13/12; C07H 1/00
[52] U.S. Cl. ............ 536/111; 536/118; 536/102; 536/92; 536/84; 536/59; 536/57
[58] Field of Search ............... 536/124, 57, 102, 536/111, 118

[56] References Cited

U.S. PATENT DOCUMENTS

| H493 | 7/1988 | Tegiacchi et al. | 106/708 |
|---|---|---|---|
| 3,066,032 | 11/1962 | Fukushima et al. | 106/165 |

FOREIGN PATENT DOCUMENTS

| 1217482 | 2/1987 | Canada . |
|---|---|---|
| 6902056 | of 0000 | Japan . |
| 37-0029945 | 7/1962 | Japan . |
| 40-0045598 | 7/1965 | Japan . |
| 53-0123895 | 10/1978 | Japan . |
| 59-0263435 | 12/1984 | Japan . |
| 60-0014645 | 1/1985 | Japan . |
| 61174485 | 8/1986 | Japan . |
| 659241 | 1/1987 | Switzerland . |
| 1336011 | 11/1973 | United Kingdom . |

*Primary Examiner*—Gary L. Kunz

[57] ABSTRACT

Sulfonated regenerated cellulose fiber obtained by adding a modifier to a viscose dope or alkali cellulose or cellulose solution and spinning fiber therefrom, wherefor the modifier is a starch etherified with $C_2$-$C_5$-alkylsulfonic acid radicals and having a degree of substitution of 0.1 to 3, a starch admixed with vinylsulfonic acid or a styrenesulfonic acid, or a polymeric styrenesulfonic acid or polymeric vinylsulfonic acid.

20 Claims, No Drawings

SULFONATION OF REGENERATED CELLULOSE WITH SULFONATED POLYMERS AND USE OF THE THUS MODIFIED FIBRES

Viscose fiber has essentially the same dyeing characteristics as cotton fiber. The dyeing of natural or regenerated cellulosic fiber therefore requires the presence of alkali-donating agents and also electrolytes in order that satisfactory fixation results may be obtained with reactive dyes.

However, there is also a need for regenerated cellulose fiber which can be dyed with cationic dyes under neutral conditions. Such a fiber, for example in a blend with acrylic fiber, would make it possible to dye the two fiber portions in a single bath and would offer time and hence economic advantages in the dyeing process as well as ecological advantages.

It is an object of the present invention to provide regenerated cellulose fiber which behaves like acrylic fiber as regards dyeing with cationic dyes under weakly acidic conditions.

This object is surprisingly achieved by admixture to a viscose dope, to alkali cellulose or to a cellulose solution of a sulfonated starch derivative or a polymeric sulfonic acid.

The present invention accordingly provides sulfonated regenerated cellulose fiber obtained by adding a modifier to a viscose dope or alkali cellulose or cellulose solution and spinning fiber therefrom, wherefor the modifier is a starch etherified with $C_2$-$C_5$-alkylsulfonic acid radicals and having a degree of substitution of 0.1 to 3, a starch admixed with vinylsulfonic acid or a styrenesulfonic acid, or a polymeric styrenesulfonic acid or polymeric vinylsulfonic acid.

The etherified starches have a degree of substitution between 0.1 and 3. A degree of substitution of 3 means that every one of the three free OH groups is etherified in every glucose unit. A degree of substitution of 0.1 means that, on average, every tenth glucose unit has one etherified OH group.

Sulfonated starches having a degree of substitution of about 0.05 are known per se (Houben-Weyl, 1987, vol. E 20, part 3, pages 2135–2151), but sulfonated starches having a degree of substitution of 0.1 or higher have not been described before.

The present invention therefore also provides above-described ($C_2$-$C_5$)-alkylsulfonic acid-etherified starches having a degree of substitution between 0.1 and 3, preferably 0.11 to 2, in particular 0.2 to 1.

Preference for the purposes of the present invention is given to those starch ethers whose ether group has the formula —O—$(CH_2)_x$—$SO_3M$ or —O—$CH_2$—CHOH—$CH_2$—$SO_3M$, where M is hydrogen, an alkali metal, such as Li, Na or K, or an alkaline earth metal, such as Mg or Ca, and x is 2 or 3. Particular preference is given to those starch ethers whose ether group has the formula —O—$CH_2CH_2$—$SO_3M$ or —O—$(CH_2)_3$—$SO_3M$.

The novel starch ethers having said high degree of substitution form as approximately 20% strength solutions in water fluent to highly viscous materials ranging in viscosity from 2 to 25 Pas, which, in the production of the regenerated cellulose fiber, can be added to the spinning dope, alkali cellulose or cellulose solution without further workup.

The degree of polymerization of the starch ethers of this invention is advantageously between 100 and 1000, preferably 200 and 600, anhydroglucose units. If the degree of polymerization were smaller than 100, the starch ether could be washed out of the fiber after spinning.

The starch ethers of this invention are prepared by reacting any desired starch, for example potato starch, maize starch or wheat starch, with a substituted $C_2$-$C_5$-alkylsulfonic acid whose substituent or substituents is or are reactive toward OH groups, having for example an α-chloro-β-hydroxy, a 1,2-epoxy or a 1-(sulfatoethyl sulfone) group, or with a cyclic sulfonate at a pH of 9 to 14, preferably of from 10 to 13. The reaction temperature is advantageously 15 to 80° C. The $C_2$-$C_5$-alkyl-sulfonic acid is reacted in a molar ratio of alkyl-sulfonic acid:one anhydroglucose unit of 0.1:1 to advantageously 4:1, depending on the degree of substitution desired for the starch.

Examples of the aforementioned substituted alkylsulfonic acids which are used for etherifying the starch are 2-chloroethanesulfonic acid, 3-chloropropanesulfonic acid and

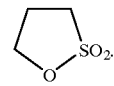

The sulfonated regenerated cellulose fiber of this invention can also be produced using a starch modified with vinylsulfonic acid or a styrenesulfonic acid, for example p-styrenesulfonic acid. This modified starch is prepared by reacting any desired starch, such as potato starch, maize starch or wheat starch, with said vinyl- or styrene-sulfonic acid, optionally in aqueous solution, at a pH of 8 to 13.

The sulfonated regenerated cellulose fiber of this invention can also be produced using polymeric styrene- and vinyl-sulfonic acids having a degree of polymerization of 200 to 600 monomer units. Examples are poly(sodium p-styrenesulfonate) and poly(sodium vinyl-sulfonate).

The modifiers used for producing the sulfonated regenerated cellulose fiber, being soluble in water, are readily dispersible directly in the spinning dope or incorporable in the viscose spinning dope as an aqueous solution, optionally with the aid of emulsifiers. The particular advantage in the case of the sulfonated starch ethers is that no intermediate isolation is necessary, since the preparation of these starch ethers gives rise to fluent materials which can be incorporated into the spinning dope to modify the regenerated cellulose fiber without further workup. The modifier is added in an amount of 1 to 20%, calculated as dry substance, preferably 1 to 12%, based on the cellulose content of the spinning dope, prior to coagulation and shaping. The filterability of the viscose shows no deterioration compared with addition-free samples, so that no plugging of the spinneret is to be observed in the course of the spinning process. The shaping of the viscose is carried out by customary and known methods, for example by means of spinnerets, a subsequent coagulation bath and optionally further after-treatment baths.

Another way of producing the sulfonated regenerated cellulose fiber is to stir the modifier into the alkali cellulose, a precursor of the viscose. Again, following xanthation and extrusion into an acidic coagulation bath, a sulfonated viscose fiber is obtained.

The fiber obtained by the methods described can, after processing into wovens and knits, be dyed by various processes, such as exhaust, padding and modern printing processes, such as inkjet processes, with cationic dyes under weakly acidic conditions.

The present invention also provides a process for producing a dyed or printed textile material composed of regenerated cellulose fiber, which comprises adding said modifiers to a viscose dope, alkali cellulose or cellulose solution and spinning fiber, for example by the viscose spinning process or from the cellulose solution, processing the fiber into a woven or knitted fabric and dyeing or printing said fabric with one or more cationic dyes.

The textile modified fiber material which is used in the dyeing process of this invention can be present in all processing states, for instance as yarn, staple, slubbing and piece goods (fabrics).

The modified textile fiber materials are dyed according to the present invention analogously to known processes for dyeing and printing fiber materials with water-soluble cationic textile dyes and using the customary temperature ranges and dye quantities. Cationic dyes are applied at the boil at a pH between 4.5 and 6. Generally no electrolyte salts are used.

Suitable dyeing processes for the purposes of this invention include for example the various exhaust processes, such as dyeing on the jigger or on the reel deck or dyeing from long or short liquor, dyeing in jet dyeing machines, dyeing by short-time pad-batch processes or by a pad-superheated steam fixation process.

Suitable dyeing processes for the purposes of this invention also include printing techniques, for example inkjet printing and transfer printing.

The dyes which are used for dyeing the sulfonated regenerated cellulose fiber are cationic in nature. Commercial names of such dyes are for example ®Maxilon, ®Astrazon, ®Remacryl, ®Basacryl and ®Sandocryl (Ullmann's Enzyklopädie der technischen Chemie, 4th edition, vol. 13, pages 571 et seq.).

The examples which follow illustrate the process of the invention. Unless otherwise stated, parts and percentages in the examples are by weight. The molar masses of the starches used are customarily based on the monomer units.

EXAMPLE 1

A poly(sodium p-styrenesulfonate) is stirred into a plant-customary fiber-grade viscose having a cellulose content of 8.9%, an alkali content of 5% and a viscosity at 30° C. of 38 falling-ball seconds, as follows: 52 parts of a 20% strength poly(sodium p-styrenesulfonate) solution are mixed with 436 parts of fiber-grade viscose. This premix is stirred into 2522 parts of fiber-grade viscose.

After devolatilization the spinning dope is spun by plant-customary viscose spinning processes into a bath comprising sulfuric acid, sodium sulfate and zinc sulfate to form fiber, which is stretched in acidic baths, cut, washed, spin finished and dried. The material thus obtained can then be dyed up by an exhaust process.

To this end, 30 parts of viscose fiber are wound on a package and the yarn is treated in a yarn dyeing apparatus which contains 450 parts, based on the weight of fiber, of a liquor which contains 0.6 part, based on the initial weight of the goods, of an electrolyte-containing dye of the general formula

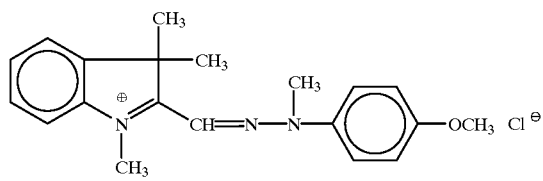

and heated to 98° C., the liquor being pumped alternately in to out and out to in. After 60 min at this temperature the liquor is dropped, and the dyeing obtained is rinsed and washed under the customary conditions. The result obtained is a level golden yellow fiber having the generally good fastness properties of cationic dyes.

EXAMPLE 2

A potato starch modified with vinylsulfonic acid is stirred into a plant-customary fiber-grade viscose having a cellulose content of 8.9%, an alkali content of 5% and a viscosity at 30° C. of 38 falling-ball seconds. The sulfonated starch was first prepared as follows: 160 g (0.96 mol) of potato starch, technically dry, are added in a kneader to 600 ml of water and 17.6 g (0.44 mol) of sodium hydroxide. 208 g (0.4 mol) of a 25% strength solution of vinylsulfonic acid were then added to the mixture. The resulting mixture was kneaded at 90° C. for 4 hours, cooled down to room temperature and adjusted with sulfuric acid to pH 6. The starch derivative thus obtained is incorporated into a fiber-grade viscose as follows: 100 parts of the modified starch are mixed with 436 parts of fiber-grade viscose. This premix is stirred into 2522 parts of fiber-grade viscose.

After devolatilization the spinning dope is spun by plant-customary viscose spinning processes into a bath comprising sulfuric acid, sodium sulfate and zinc sulfate to form fiber, which is stretched in acidic baths, cut, washed, spin finished and dried.

10 parts of this dry viscose fiber are then admixed in a dyeing apparatus with 100 parts of water. The temperature is raised to 98° C. and a total of 0.1 part of a 50% strength electrolyte-containing dye powder of the formula

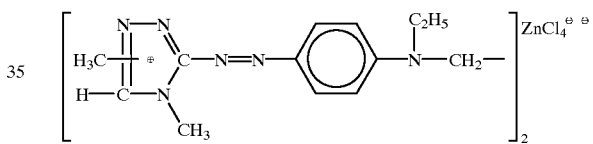

is metered in over a period of 30 min. Following a further liquor circulation period of 5 min the remaining, colorless liquor is dropped and the material is conventionally washed out and dried. The result obtained is a strong, bordeaux-colored dyeing having very good use fastness properties.

EXAMPLE 3

A fiber-grade viscose as described in Example 2 is admixed with a starch synthesized according to the following description: 200 g (1.2 mol) of maize starch, technically dry, are added in a kneader to 500 ml of water and 24 g (0.6 mol) of sodium hydroxide. 73.6 g (0.4 mol) of chloroethane-sulfonic acid, dissolved in 300 ml of water, are then added to the mixture. The resulting mixture is stirred at 85° C. for 4 hours, if necessary kept stirrable by further addition of water, cooled down to room temperature and adjusted with sulfuric acid to pH 6.

The product is stirred into the viscose as described in Example 2. After devolatilization the spinning dope is spun by plant-customary viscose spinning processes into a bath comprising sulfuric acid, sodium sulfate and zinc sulfate to form fiber, which is stretched in acidic baths, cut, washed, spin finished and dried.

Weaving then gives a textile viscose fabric which can be further processed directly in a pad-dyeing process. For this the fabric has applied to it at 25° C., by means of a pad-mangle, an aqueous dye solution which, per 1000 parts by volume, includes in solution 20 parts of the dye of the formula

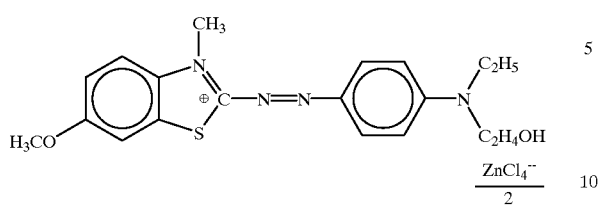

and 3 parts of a commercial nonionic wetting agent, to a liquor takeup of 80%, based on weight of fiber. The fabric padded with the dye solution is left in a steamer at 102° C. for 8 minutes and then rinsed with cold and hot water, which may contain a commercial surfactant, and if necessary subsequently rinsed once more with cold water and dried. The result obtained is a strong level blue dyeing having good allround fastness properties, especially good rub and light fastness properties.

EXAMPLE 4

Preparation of a Sulfonated Starch 200 g (1.2 mol) of potato starch, technically dry, are added in a kneader to 500 ml of water in which 24 g (0.6 mol) of sodium hydroxide have been dissolved before-hand. Then 48.8 g (0.4 mol) of 1,3-propane sultone, dissolved in 50 ml of ethanol, are added to the mixture. The resulting mixture is kneaded at 85° C. for 4 hours, if necessary kept stirrable by further addition of water, cooled down to room temperature and adjusted with sulfuric acid pH 6. The viscosity is 18 Pas at 20° C.

To further characterize the starch derivative, 5 parts of the viscous mass are dissolved in 100 parts water and freed of unconverted starting materials and neutralization salts by means of a membrane desalting technique. The purified starch derivative is evaporated to dryness under reduced pressure. The degree of substitution is determined via a sulfur assay of the modified starch. The sulfur content was 3% in the present case.

The degree of substitution is calculated according to the following formulae:

162+122/32×[%S]=MW

[%S]/32×MW:100=degree of substitution

The sulfonated starch accordingly has a degree of substitution of 0.16.

Further Examples

Example 1 is repeated to prepare a modified viscose which is dyed by customary processes using the below-recited cationic dyes.

C.I. Basic Blue 54 (C.I. No. 11 052)

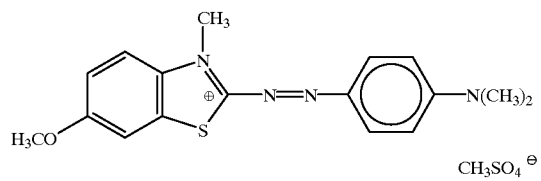

C.I. Basic Blue 16 (C.I. No. 12 210)

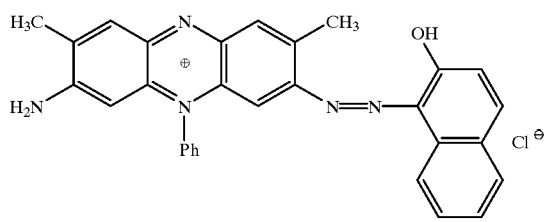

C.I. Basic Blue 26 (C.I. No. 44 045)

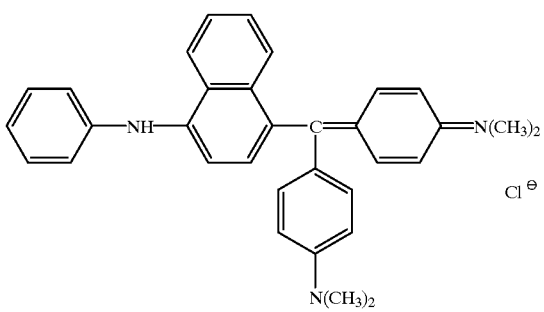

C.I. Basic Blue 73

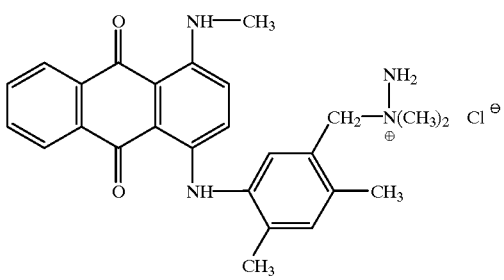

C.I. Basic Yellow 91

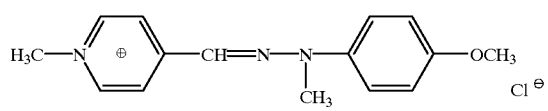

C.I. Basic Green 12

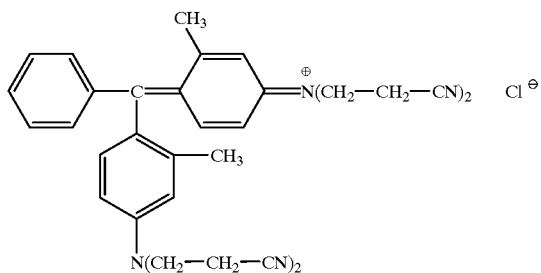

C.I. Basic Orange 30

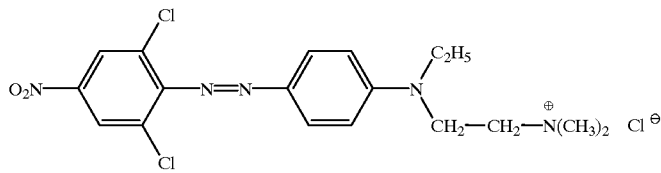

C.I. Basic Orange 38

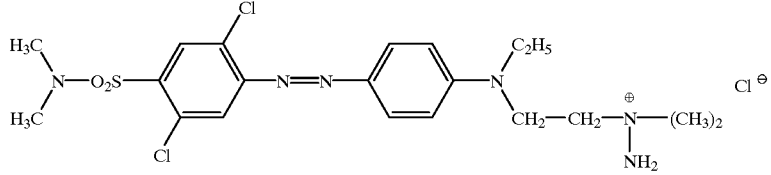

C.I. Basic Orange 41

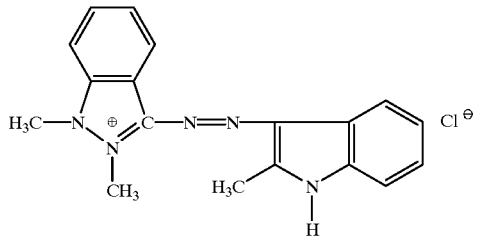

What is claimed is:

1. Sulfonated regenerated cellulose fiber obtained by adding a modifier to a viscose dope or alkali cellulose or cellulose solution and spinning fiber therefrom, wherefor the modifier is
   (a) a starch etherified with $C_2$-$C_5$-alkylsulfonic acid radicals and having a degree of substitution of 0.1 to 3,
   (b) a starch admixed with vinylsulfonic acid,
   (c) a starch admixed with styrene-sulfonic acid, or
   (d) polymeric vinylsulfonic acid,
and wherein the ether group of the etherified starch has the formula —O—$(CH_2)_x$—$SO_3M$ or —O—$CH_2$—CHOH—$CH_2$—$SO_3M$, where M is hydrogen, an alkali metal or an alkaline earth metal and x is 2 or 3.

2. The sulfonated regenerated cellulose fiber of claim 1, wherein the ether group of the etherified starch has the formula —O—$CH_2CH_2$—$SO_3M$ or —O—$(CH_2)_3$—$SO_3M$, where M is hydrogen, Li, Na, K, Mg/2 or Ca/2.

3. The sulfonated regenerated cellulose fiber of claim 1, wherein the styrenesulfonic acid is p-styrene-sulfonic acid.

4. Sulfonated regenerated cellulose fiber which has been obtained by the process comprising:
   adding to viscose dope or to an alkali cellulose or cellulose solution at least one of the following modifiers, in a concentration of 1 to 20% by weight: a starch etherified with at least one $C_2$-$C_5$-alkylsulfonic acid radical and having a degree of substitution of 0.1 to 3 and said etherified starch has a degree of polymerization ranging from 200 to 1000 anhydroglucose units, a starch admixed with vinyl sulfonic acid or a styrenesulfonic acid, or a polymeric styrenesulfonic acid or polymeric vinylsulfonic acid, and
   spinning fiber from the resulting modified viscose dope or alkali cellulose or cellulose solution.

5. The sulfonated regenerated cellulose fiber of claim 4, wherefor the modifier has been added in a concentration of 1 to 12% by weight, calculated as dry substance, based on the cellulose content of the spinning dope.

6. A starch etherified with one or more $C_2$-$C_5$-alkylsulfonate radicals and having a degree of substitution between 0.1 and 3, and said etherified starch has a degree of polymerization ranging from 200 to 1000 anhydroglucose units.

7. The etherified starch of claim 6, wherein the ether groups are —O—$(CH_2)_x$—$SO_3M$ or —O—$CH_2$—CHOH—$CH_2$—$SO_3M$, where M is hydrogen, an alkali metal or an alkaline earth metal and x is 2 or 3.

8. The etherified starch of claim 6, wherein the ether groups are —O—$CH_2CH_2$—$SO_3M$ or —O—$(CH_2)_3$—$SO_3M$, where M is hydrogen, Li, Na, K, Mg/2 or Ca/2.

9. The etherified starch of claim 6, having a degree of polymerization between 100 and 1000 anhydroglucose units.

10. A process for preparing an etherified starch as claimed in claim 6, which comprises reacting a starch at a pH between 9 and 14, with a substituted $C_2$-$C_5$-alkylsulfonic acid whose substituent or substituents is or are reactive toward OH groups or with a cyclic sulfonate.

11. The process of claim 10, wherein the substituent(s) is α-chloro-β-hydroxy; 1,2-epoxy or 1-(sulfatoethyl sulfone).

12. The process of claim 10, wherein the starch is reacted with 2-choroethanesulfonic acid, 3-chloropropanesulfonic acid or 1,3-propane sultone.

13. A process for producing a dyed or printed textile material comprising the step of weaving or knitting the sulfonated regenerated cellulose fiber of claim 1, comprising the step of weaving or knitting said sulfonated regenerated cellulose fiber into a woven or knitted fabric, and dyeing or printing the resulting woven or knitted fabric with at least one cationic dye.

14. The etherified starch of claim 6, wherein said degree of substitution is from 0.11 to 2.

15. The etherified starch of claim 7, wherein the ether groups are —O—CH$_2$CH$_2$—SO$_2$M or —O—(CH$_2$)$_3$—SO$_3$M, where M is hydrogen, Li, Na, K, Mg/2 or Ca/2.

16. The process of claim 11, wherein the starch is reacted with 2-chloroethanesulfonic acid, 3-chloropropanesulfonic acid or 1,3-propane sultone.

17. The etherified starch of claim 9, wherein said etherified starch has a degree of polymerization ranging from 200 to 600 anhydroglucose units.

18. The etherified starch of claim 6, having a degree of polymerization between 200 and 600 anhydroglucose units.

19. Sulfonated regenerated cellulose fiber obtained by adding a modifier to a viscose dope or alkali cellulose or cellulose solution and spinning fiber therefrom, wherefor the modifier is (a) a starch etherified with C$_2$-C$_5$-alkylsulfonic acid radicals and having a degree of substitution of 0.1 to 3, (b) a starch admixed with vinylsulfonic acid or (c) a starch admixed with styrene-sulfonic acid, and wherein the ether group of the etherified starch has the formula —O—(CH$_2$)$_x$—SO$_3$M or —O—CH$_2$—CHOH—CH$_2$—SO$_3$M, where M is hydrogen, an alkali metal or an alkaline earth metal and x is 2 or 3.

20. The process as claimed in claim 10, wherein the substituted C$_2$-C$_5$-alkylsulphonate acid is 2-chloroethane sulphonic acid, 3-chloropropane sulphonic acid, or

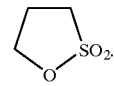

* * * * *